US010025462B1

(12) United States Patent
Ledet

(10) Patent No.: US 10,025,462 B1
(45) Date of Patent: Jul. 17, 2018

(54) COLOR BASED SEARCH APPLICATION INTERFACE AND CORRESPONDING CONTROL FUNCTIONS

(71) Applicant: Open Invention Network LLC, Durham, NC (US)

(72) Inventor: David Gerard Ledet, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 163 days.

(21) Appl. No.: 14/472,594

(22) Filed: Aug. 29, 2014

(51) Int. Cl.
*G06F 3/048* (2013.01)
*G06F 3/0482* (2013.01)
*G06F 17/30* (2006.01)

(52) U.S. Cl.
CPC ...... *G06F 3/0482* (2013.01); *G06F 17/30522* (2013.01)

(58) Field of Classification Search
CPC .................. G06F 3/0482; G06F 17/30522
USPC .................. 715/843, 834, 808, 810, 825
See application file for complete search history.

(56) References Cited

U.S. PATENT DOCUMENTS

| 5,664,133 | A | 9/1997 | Malamud et al. |
| 2004/0263475 | A1* | 12/2004 | Wecker ............... G06F 3/04812 345/157 |
| 2007/0192677 | A1* | 8/2007 | O'Leary ................ G06Q 10/00 715/212 |
| 2013/0019208 | A1 | 1/2013 | Kotler et al. |

* cited by examiner

*Primary Examiner* — Andrey Belousov

(57) ABSTRACT

A user interface may be accessed and used to illustrate various user options. One example method of operation may include initiating an application on a user computing device, receiving a selection to initiate a menu associated with the application which includes a number of selection options on a user display interface of the user computing device, and a result the menu is displayed in a position of the user display interface with reference to coordinates of a recent operation performed on the user display interface.

22 Claims, 14 Drawing Sheets

1200

COLOR BASED SEARCH APPLICATION INTERFACE AND CORRESPONDING CONTROL FUNCTIONS

TECHNICAL FIELD OF THE APPLICATION

This application relates to initiating, populating and displaying a user accessible menu customized to operate optimally on a smaller computing device, and to providing menu options that are based on limited display sizes and historical user input commands and/or actions.

BACKGROUND OF THE APPLICATION

Conventionally, when a user accesses a mobile device or other portable electronic device (i.e., tablet, smartphone, etc.) the display size is limited and only provides a certain amount of viewable area. Many applications that are popular involve complex menu systems. These applications are normally utilized on a desktop and/or laptop computer, which are known to have a larger display permitting access to a full menu. The menus associated with these applications normally span across the entire width of the application display area. As the functionality of the application grows, so does the availability of the menu icons allowing easy access to the different functions.

Furthermore, the menus are complex in nature offering many different options for use by the application's user. The users of these applications are generally more familiar with the complex menu system as many of the applications are used daily. One of the many applications that involve potentially complex menu systems is a word process application. In these applications, the menus are grouped together allowing the functionality offered by the menu selections to be located easily. Other applications have turned to tab components that offer a different set of menus for each tab. This allows the application to re-use the real estate as the menu items are redrawn for each selected tab.

The evolution of computer technologies has allowed more functionality available on smaller devices. As users have migrated to smaller devices, they desire more functionality from the applications executing on the same devices. The memory and processing capacity of the smaller devices is not at issue as these devices are configured to permit similar functionality as their larger counterparts noted above. The concern is the size of the smaller displays, or display size 'real estate', which may limit the functionality of the application currently being executed on the smaller device.

On large displays (for example desktop or laptop computers), applications make use of the large display area by utilizing the top area of the application to display the many menu items. Many applications utilize small pictures, or icons, that make it easier for the user to become familiar with each menu item. In addition, many of the menu items are grouped together into tabs, permitting the user to click a particular tab to gain access to a specific group of menu items. Because of the available real estate, many of the menus also allow drop-down items that show further sub-menu items related to a given menu item.

Application developers rely on many tools that permit the creation and programming of contextual menus, regardless of the programming language utilized. Users of current computer applications have become familiar with these menu functionalities and depend on them to optimize workflow. Due to the vast complex nature of computer applications, a well-written menu system is a major part of the application and may allow the user to better enjoy the application.

SUMMARY OF THE APPLICATION

One example embodiment may provide a method that includes initiating an application on a user computing device, receiving a selection to initiate a menu associated with the application including a plurality of selection options on a user display interface of the user computing device, and displaying the menu in a position of the user display interface with reference to coordinates of a recent operation performed on the user display interface.

Another example embodiment may include an apparatus that includes a processor configured to initiate an application on a user computing device, a receiver configured to receive a selection to initiate a menu associated with the application comprising a plurality of selection options on a user display interface of the user computing device, and the processor is further configured to display the menu in a position of the user display interface with reference to coordinates of a recent operation performed on the user display interface.

Another example embodiment may include a method that includes initiating an application on a user computing device, receiving a selection to initiate a circular menu associated with the application comprising a plurality of selection options on a user display interface of the user computing device, identifying a user action associated with the application, and populating the circular menu with menu options linked to the user action identified.

Another example embodiment may include an apparatus that includes a processor configured to initiate an application on a user computing device, and a receiver configured to receive a selection to initiate a circular menu associated with the application including a plurality of selection options on a user display interface of the user computing device, and where the processor is further configured to identify a user action associated with the application, and populate the circular menu with menu options linked to the user action identified.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, graphical user interface menus may include certain application menus. Other example embodiments described herein include displaying a context menu navigable via a user interface, floating menus, menus having a slide component, hot buttons, key sequences, populating a context menu, content of a context menu, activating the context menu, dynamic interactions, speech interactions, dynamically building the context menu, circular context menus, application interactions with a touchscreen device, stacked menu(s), etc.

Example embodiments include a dynamic menu configuration which is provided to permit an application's menu to be displayed on a smaller display, for example a mobile device, or any other likewise device that has a smaller display area than a normal computer or related device. The menu may be intuitive in nature to permit the user to interact with menus in a similar manner to the menus found in similar applications on larger displays.

Figure 1:
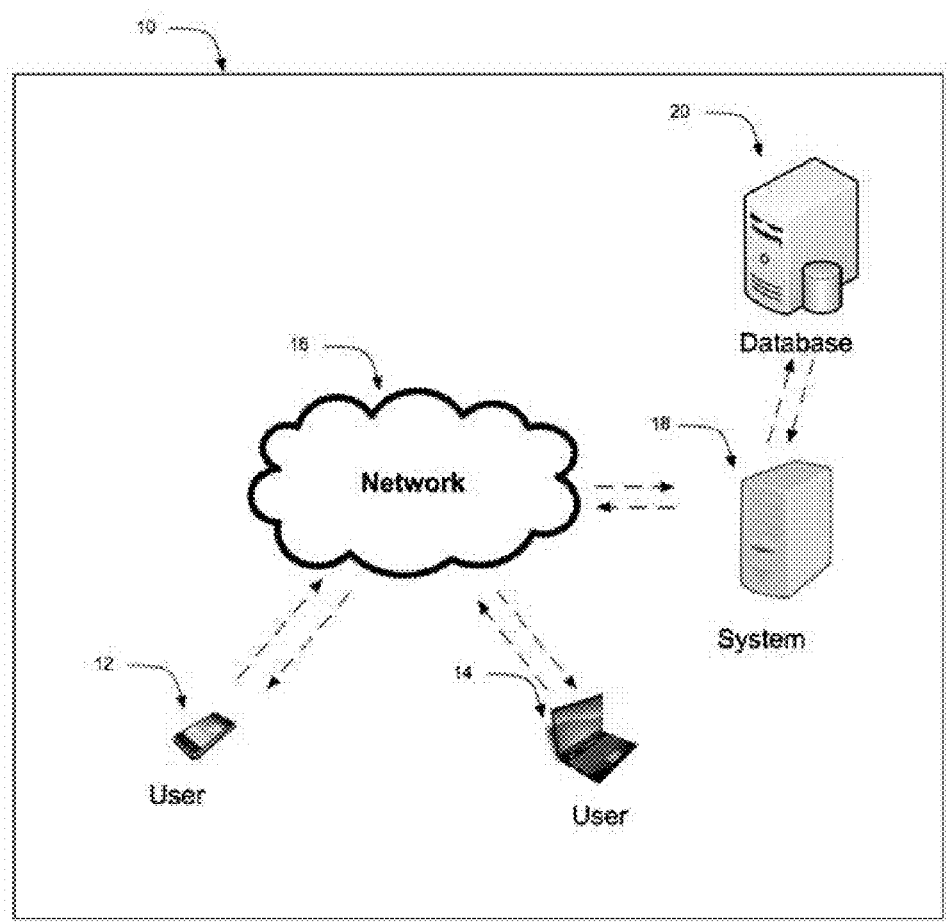
FIG. 1 illustrates a system diagram according to an example embodiment of the present application.

FIG. 1 illustrates a system diagram 10 according to an example embodiment of the present application. Referring to FIG. 1, the network 16 permits a user utilizing a mobile client machine 12 or a more traditional computer 14 to access the current application (in the form of software), which can be downloaded from the system computing platform 18 in communication with a remote database 20 and/or which may currently reside on the client's device 12/14.

The network 16 may include fewer or greater components or different components, such as wired or wireless electronic devices such as clients, servers, phones, tablets and computers as well as various networks such as the Internet, intranets and public and private networks, without departing from the scope of the present application. The client device 12/14 can be any of a mobile laptop device and/or a personal desktop computer or a mobile device. The computing device 12/14 is connected to the network 16. It should be noted that other types of devices, in addition to devices 12/14, might be used with the present application. For example, a PDA, a tablet computer, a laptop, an MP3 player, a gaming device (such as a hand held system or home based system) and the like (including a P.C. or other wired device) that can also transmit and receive information could be used with the present application.

The database 20 is directly connected to the computer system 18, and can be a part of or co-located with the system computer 18 or connected remotely through the network 16 without deviating from the scope of the application. If the application resides on a mobile device 12, the application may be downloaded through a platform, such as an application store or market residing on the device or accessed via the device. The user interacts with the application executing on the user device 12/14 via a pointing device, a computer keyboard or any other commonly used input devices. The current application can work with any device such as a personal computer with a touch screen, a laptop with a touch screen, a personal computing tablet, a smartphone or any device with a processor, memory and a touch screen.

Example embodiments provide a context menu for use on a device. The device, which could have a restricted display area, for example, a mobile device, tablet, or any other device that is smaller in nature than a desktop or laptop computer monitor. Embodiments described herein provide functionality surrounding the display of the context menu, menu items included in the context menu, accessing the context menu, and interactions with the context menu. Due to the size of the display area of the device utilizing the application, the design of the accessibility of the context menu is optimal for smaller display areas. On a normal display (for example a desktop or laptop computer display), less attention is needed in the functional design of the menu function as there is ample real estate to utilize the application functionality.

When the display is on a smaller device (for example a mobile device or tablet computer), the menu system functional design is a priority. An implementation of the menu configuration on a smaller device can easily become a hindrance to the interaction of the application if careful design of the menu is not considered. Also, the location of the context menu on the display of the device is important to permit the user to retain functionality of the application.

In one example embodiment, the context menu appears to hover over the application. The hovering may be represented by the menu having a shadow that is colored slightly differently than the component providing the appearance of "floating" over the application. The component either automatically moves about the display avoiding conflict with the user's interaction with the application or can be moved by the user touching the context menu with the pointing device and moving the menu component without removing the pointing device. The menu component will move to the location where the pointing device is removed from the display.

The application may modify the location of the hovering menu if the user uses the pointing device to touch the screen near the menu. The menu either moves above the location of the touch if there is space available, or the menu moves below the touched are depending on the amount of room available on the touch screen. In other embodiments, the context menu can move to any other location on the screen, such as to the left or right of the touched location. In response to received touching or input, the application causes the computer to record the X-axis and Y-axis present location of the user's pointing device touching the screen, and calculate a location on the screen where the context menu will appear in an area on the touchscreen away from where the pointing device last touched the screen. For example, the detected location may represent a starting point and the final location may be calculated based on a threshold distance from the initial location (i.e., 5, 10, 15 units of distance). The final location may be a reference point for the center of the menu as it is displayed and may be linked to a particular portion of the menu prior to being used as the location of the menu on the display.

Figure 2:
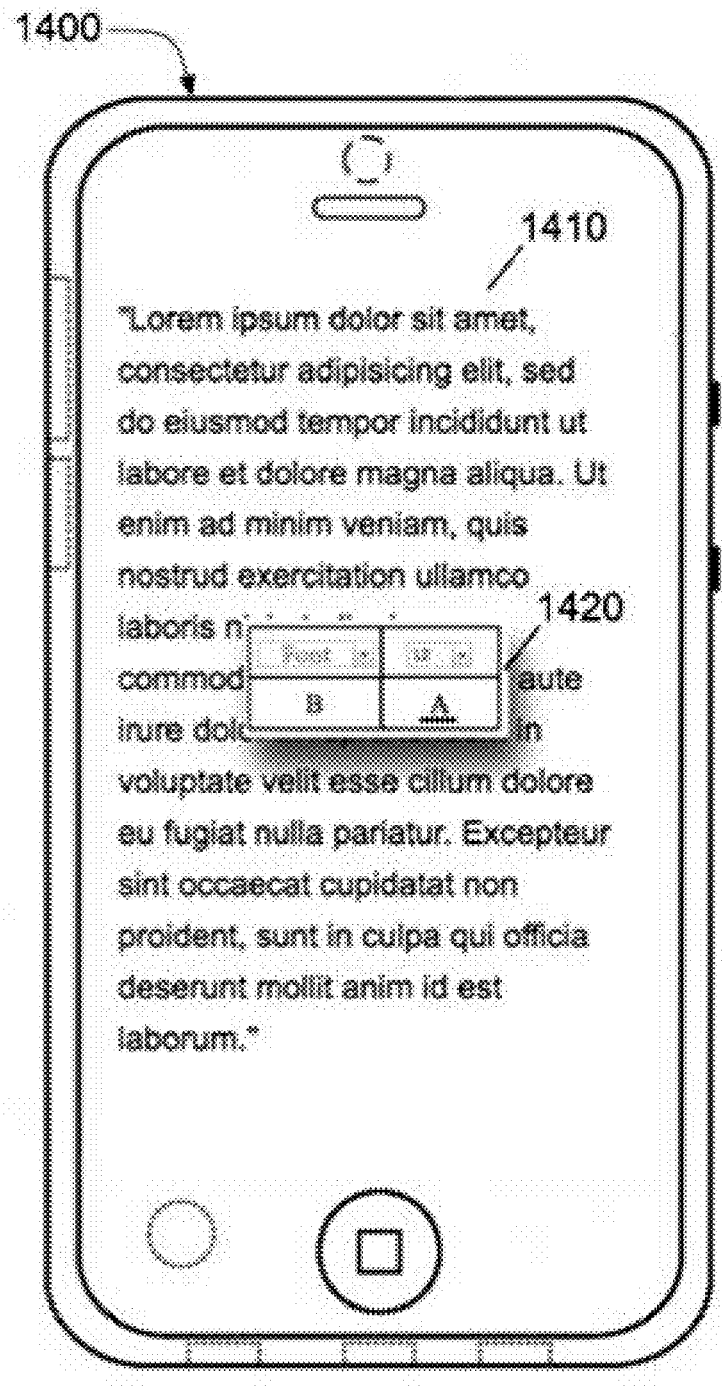
FIG. 2 illustrates a mobile device displaying a context menu according to an example embodiment of the present application.

FIG. 2 illustrates a mobile device displaying a context menu according to an example embodiment of the present application. Referring to FIG. 2, the mobile device 1400 includes an application being utilized with a word processing program 1410. The text of the word processing program is shown on the mobile device. The context menu 1420 appears hovering over the text in the world processing application. The user is able to move the context menu to another location of the display of the device by selecting the context menu 1420 with a pointing device (i.e., finger, styles, etc.) and dragging it to another area and releasing the pointing device. The content of the context menu 1420 has four menu items in this example. The menu may have more or less than four items without deviating from the scope of the current application.

In another embodiment, the context menu appears to the right or the left of the application and is designed to be a slide component where the context menu slides out when pressed with the user's pointing device. The sliding component contains a tab with a graphic that permits the user to invoke the slide component to slide out and slide back into the side of the display. The tab contains either a ">" corresponding to sliding the component to the right, or a "<" corresponding to sliding the component to the left as illustrated further in FIG. 3.

Figure 3:
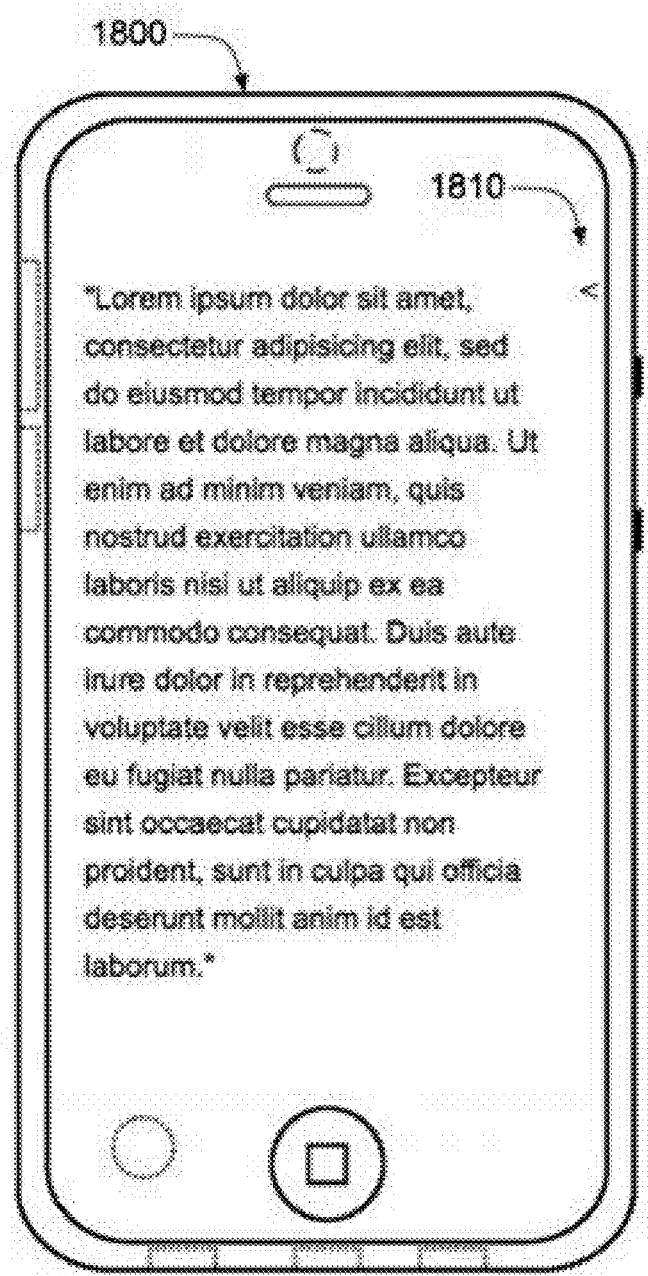
FIG. 3 illustrates a mobile device displaying a closed sliding context menu according to an example embodiment of the present application.

FIG. 3 illustrates a mobile device displaying a closed sliding context menu according to an example embodiment of the present application. Referring to FIG. 3, a mobile device 1800 is illustrated with the sliding context menu component in a closed state. An arrow 1810 shows a small button that permits the sliding of the context menu. When pressed by the user's pointing device, the button 1810 causes the sliding context menu to move out from the right-hand side of the screen. This implementation can also be functionally placed on the top, bottom, or left side of the display without deviating from the scope of the current application.

Figure 4:
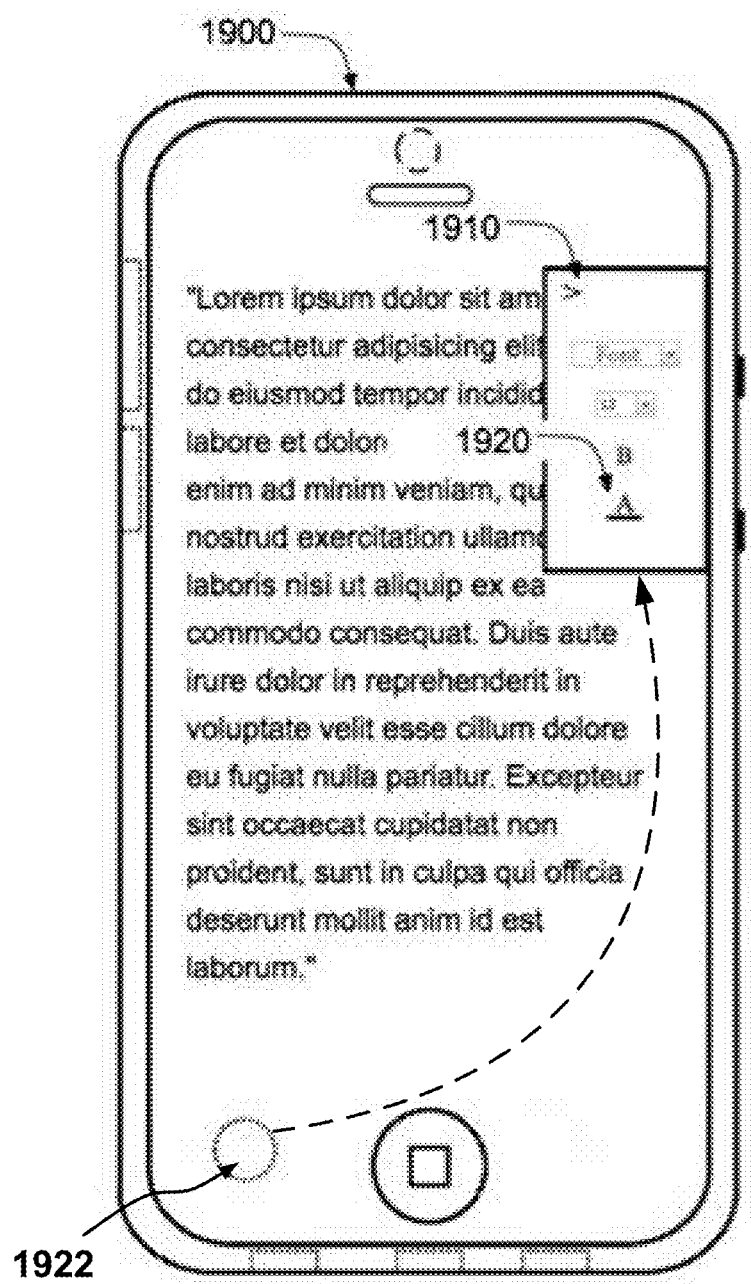
FIG. 4 illustrates a mobile device displaying an open sliding context menu according to an example embodiment of the present application.

FIG. 4 illustrates a mobile device displaying an open sliding context menu according to an example embodiment of the present application. Referring to FIG. 4, the mobile device 1900 has an open sliding context in the 'open' position. There is a small arrow 1910 on the top of the sliding component that, when selected, permits the sliding context menu to slide to the right. The menu items are listed 1920 in the sliding menu component.

In example embodiments, there exists a small button icon 1922, hereinafter referred to as the 'hot button'. In this embodiment, the context menu may first not be visible on the display. This hot button 1922 exists at all times on the display and is either in a fixed location on the display, or moved around the display as the user interacts with the application. For example, the hot button 1922 is placed in the right or left-hand margin, according to which area has more blank space. As the user scrolls through the application, or continues to input text, the hot button moves to other parts of the display, attempting to avoid interaction with the user. The hot button when selected or when a voice command is received that the application understands as the command to display the context menu, the context menu 1920 is displayed on the device. Once the context menu item 1920 is selected, the context menu 1920 is removed and the hot button 1922 is returned to the display.

In another embodiment, one or more keys or buttons on the device are programmed to display the context menu in the application. This key sequence can be configured by the user to be any key(s) on the device. Alternately, voice and/or any other types of input can be programmed to interact with accessing the context menu on the device. When a menu item is selected from the context menu, the context menu is removed from the display.

The menu items in the context menu reflect the most commonly utilized menu items that would be of interest by the user based on a history of button usage. To obtain the most commonly utilized menu items, the application regularly sends the items selected by all users of the application to the system computer, which in turn stores the record in the database. This permits the application to record the items that the users of the application select given where they are currently operating within the application. For example, if the user was just beginning the application, the context menu would contain those menu items that would be of the use functions at that time. As the user continues to utilize the application, the menu items in the context menu would change to reflect the most popular menu items.

Figure 5:
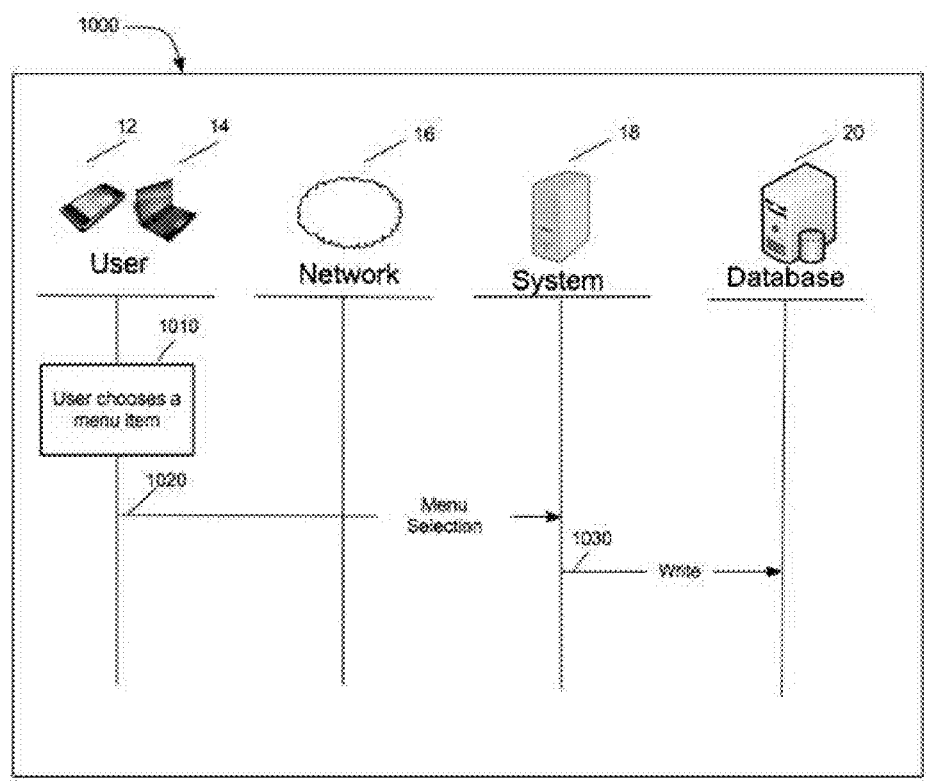
FIG. 5 illustrates a system diagram of an operation of sending a menu item to a database according to example embodiments.

FIG. 5 illustrates a system diagram of an operation of sending a menu item to a database according to example embodiments. Referring to FIG. 5, a message flow of the application sending the current menu choice to a database 1000 is illustrated. When the user selects a menu item in the application 1010, the application sends a menu selection message 1020 to the system computer 18 through the network 16. The system computer 18, upon receipt of the menu selection message 1020, writes the entry to the database 20 via a write message command 1030. The database can be a SQL database or any other type of file system and/or database used to record data from the system computer 18. The populate menu selections message 1020 that is sent to the database 20 which contains at least two types of information including a type of action that the user was performing when the menu item was selected, and a select menu item of the user. Contents of the populate menu selections message may include action=new paragraph and menu item=style headings.

In this example, the application determines that the user has begun a new paragraph and sends "New Paragraph" as the action message. The user may have selected to change the style of the paragraph. For example, the user has selected to change the style to a heading type. The menu item sent to the database is "Style Headings" as the action. The database records the information and in the subsequent interactions, the possible menu items when a user begins a new paragraph may include the "Style Headings" entry, if it is selected by one or more or even a majority of users.

Figure 6:
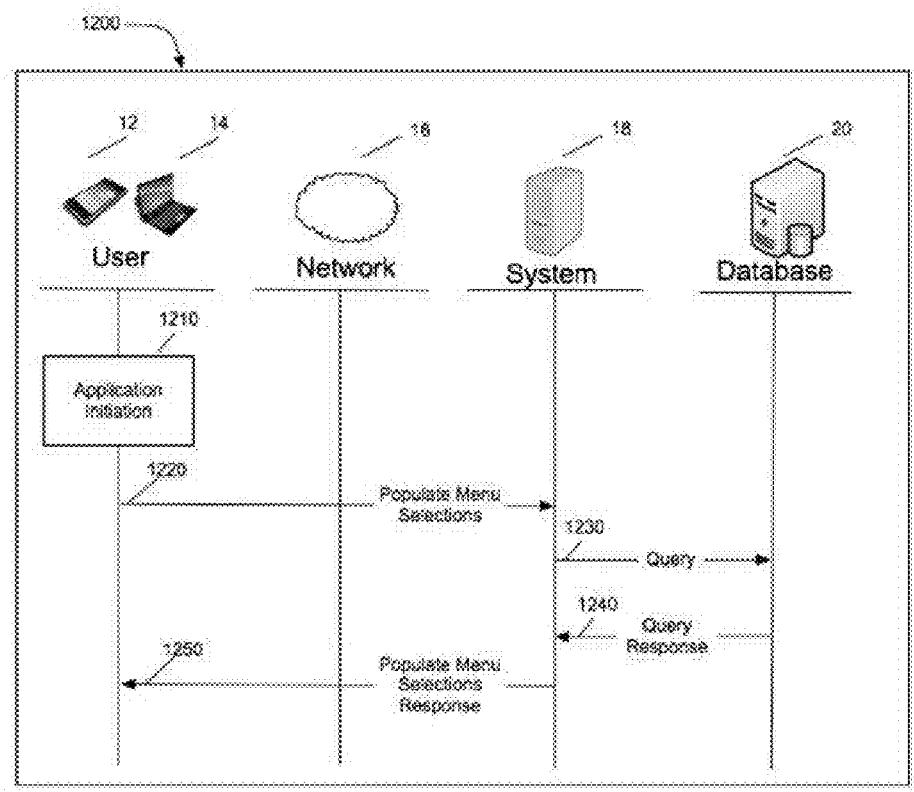
FIG. 6 illustrates a system diagram of a message flow to populate a menu according to example embodiments.

FIG. 6 illustrates a system diagram of a message flow to populate a menu according to example embodiments. Referring to FIG. 6, the message flow 1200 of the application reflects the determining of the menu items upon application initiation 1210. Upon the start of the application, the initial menu items to be populated are obtained from querying the database 20. The application sends a populate menu selections message 1220 to the system computer 18. The message is routed through the network 16. Upon reception of the populate menu selections message 1220, the system computer 18 queries the database 20 by sending one or more query messages 1230. The database 20 returns a response 1240 to the system computer 18, which then returns a single populate menu selections response message 1250 to the application 12/14. The application uses the data in the populate menu selections response message 1250 to populate the context menu. In populating the response message, the database returns the four, five, six, etc., most popular menu items for each action store in the database. The flowchart of FIG. 7 depicts the algorithm utilized in determining the menu items included in the response message for each given user action of the application.

Figure 7:
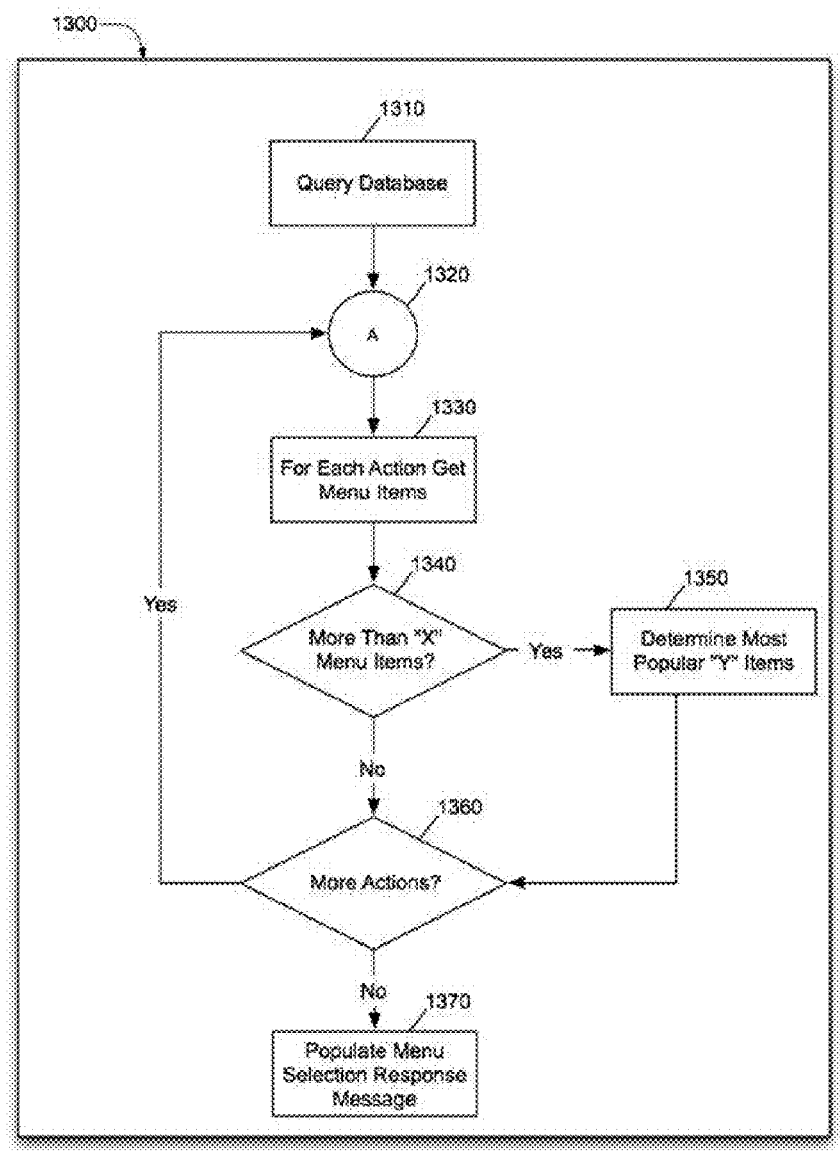
FIG. 7 illustrates a flow diagram of a menu population procedure according to example embodiments.

FIG. 7 illustrates a flow diagram of a menu population procedure according to example embodiments. Referring to FIG. 7, the algorithm used to populate the selection response message is included in the flow diagram operations 1300. The query database message is received by the system computer 18 at operation 1310. The system computer loops through all of the possible actions of the user at operation 1320. The system computer 18 queries the database 20 for each action possible for the user obtaining the menu items for the respective user action 1330. If the database 20 returns more than "X" menu items for a user action 1340, the system computer 18 determines the most popular items, for example, the top four items by obtaining the menu items that are populated the most number of times in the database 1350. If less than the expected number of menu items are returned from the database 20, for example, less than the four menu items, then the next user action is queried, assuming that there are more actions 1360. When all user actions are processed, the menu selection response message is populated with the results obtained from the database 20 at operation 1370. The message is sent back to the application executing on the user's computer and/or device 12/14.

The items in the context menu relate to the most useful actions given the current state of the user and/or the application being utilized. For example, in an editing program, the example below depicts the items in the context menu and the given action of the user with the application:

| User Action | Menu Items |
|---|---|
| Beginning new paragraph | Font |
| | Bold |
| | Font Size |
| | Font Color |
| Typing a paragraph | Italics |
| | Underline |
| | Spelling |
| | Table |
| Typing a Header | Bold |
| | Align Paragraph |
| | Choose Heading Style |
| | Font Color |
| Table | Insert Line |
| | Insert Column |
| | Format Cell |
| | Borders and Colors. |

As shown above, the table of actions and menu items depict the context menu items and the respective actions. The contents of the context menu are paired with the associated user actions. The initial menu items are selected by the application by querying the database 20 upon application initialization.

In other examples, other menu actions and menu items can be provided such as those related to actions such as inserting, design, layout, reviewing and the like. The menu items in the context menu can be obtained by querying the database 20 if necessary. The application on the user's device 12/14 sends a message to the system computer 18 and/or the database 20 if necessary. This message, and the corresponding response, can contain the menu items used to build the context menu that is displayed to the user via the application.

In operation, when the user moves the pointing device via the user's hand, voice, and eye gestures, or any other moving or pointing capability over the context menu, the context menu will be "activated". The context menu component is altered to another state, hereinafter referred to as the 'activated state'. Once the context menu enters the activated state, the presentation of the context menu can be altered. The context menu can be altered in numerous ways including changing color, the changing style of the context menu, for example changed to a bold font, or italicized font, or any other similar alteration, and/or the context menu component is altered to seem like it is raised from the display by applying a three-dimensional shadow effect. In addition or instead the shape, size and appearance of the menu can also be altered as part of the altered state, or any other similar change. Once the context menu is in the activated state, receipt by the application based on input by the user alters the content of the context menus. This input can be keys typed by the user on the device, spoken words from the user, or any other input from the user. The input from the user allows the menu items to be altered in the context menu. This functionality permits other groups of menu items to be viewed in the context menu. For example, if the user wishes to add a table to a word processing application, the user changes the context menu to the activated state, and presses the "T" key on the device, or speaks into the device and the application utilizes speech-to-text to convert the spoken voice into a usable command. The context menu then displays the most useful table-related commands. These menu items would be those table-related menu items that were received in the populate menu items response message 1250, which were received from the Database 20.

In another embodiment of the present application, functional actions occur automatically based on what the user is doing. The application records what the user is typing, such as during a word processing application, and the context menu is dynamically activated. In this embodiment, there is no user interaction necessary to perform the functionality. For example, in the case of a word processing program, the user types the phrase: "table below" such as "based on the table below" the application automatically either initiates the context menu for the table functions or inserts a table, permitting the user to begin editing the table and/or configuring the table. Additionally, the application may also automatically retrieve various tables that the user can select. For example, tables that the user has previously created, various publications that the user has saved, table(s) that the user has previously saved from the Internet or any other social media website.

When the user types the phrase "table below" such as "based on the table below", the application on the user's device 12/14 sends a message to the system computer 18 and/or the database 20, if necessary. This message, and the corresponding response, can contain the table(s) to display. In another embodiment, voice interactions permit the user to speak into the device and the application responds by performing actions. Utilizing speech-to-text, the application converts the spoken voice into text and performs the action spoken by the user. Speech recognition is built into various common mobile device SDKs. For example, in the ANDROID release of SDK 1.5, a library included in that release called 'android.speech' permits a speech recognition functionality. Speech recognition is performed through a 'RecognizerIntent' function. The intent starts an activity that will prompt the user for speech and send it through the speech recognizer. For example, the code below starts an activity with an intent and the application waits for the result: Intent intent=new Intent("android.speech.action.RECOGNIZE_SPEECH"); startActivityForResult(intent, 0).

The 'startActivityForResult' function launches an activity returning the result. While speech recognition is performed, it displays an overlay over the application, and when completed returns the results back for the present activity to process. The action: 'RECOGNIZE_SPEECH' starts an activity to recognize the speech and send the result back to the activity. The voice recognition application that handles the intent processes the voice input, then passes the recognized string back to the application by calling the onActivityResult( ) callback.

ANDROID, for example, supports two language models for speech analysis: free_form for dictation, and web_search for shorter, search-like phrases. The application may utilize the free form model. The example below depicts code to integrate speech-to-text to the application:

```
// Check to see if a recognition activity is present
PackageManager pkgmgr = getPackageManager( );
List activities = pkgmgr.queryIntentActivities(
    new Intent(RecognizerIntent.ACTION_RECOGNIZE_SPEECH), 0);
    if (activities.size( ) != 0)
    { speakButton.setOnClickListener(this);
    } else
        { speakButton.setEnabled(false);
          speakButton.setText("Recognizer is not present");
        }
    }
```

The above-noted pseudocode of a speech conversion function may provide verifiying that the target mobile device is able to interwork with the speech input, then the code uses 'startActivityForResult( )' to broadcast an intent requesting voice recognition, including the extra parameter specifying one of two language models. The voice recognition application that handles the intent processes the voice input, then passes the recognized string back to your application by calling the onActivityResult( ) callback. For example, assume that the application is executing in a word processing program, the user wishing to add a table speaks the phrase: "drop table below". The device calls the RECOGNIZE_SPEECH method or intent enabling the mobile device to convert any speech to text. The result of the convert speech is utilized as input to the application, allowing the additional functionality of performing the action based on the converted text. The application responds by either automatically initiating the context menu for the table function, automatically inserting a table, permitting the user to begin editing the table and/or configuring the table, and automatically initiating various tables that the user can select. For example, tables that the user had previously created, various publications that the user has saved, table(s) that the user has previously saved from the Internet or any other social media website.

In another example embodiment, the system computer records at least one element of information used to build the context menu in future instantiations. In this embodiment, as the user interacts with the context menu, at least one of the following data is recorded by the system computer. The particular location in the document that the user is editing at the time that the context menu was instantiated, and the selected menu item from the context menu. This information is stored at least one of the following locations, either inline in the mobile device (12/14), in the system computer 18 and/or offsite in an associated database 20. As the user interacts with the context menu, this information permits the application to determine the most likely used menu items given the current location of the user in the document being edited.

Figure 8:
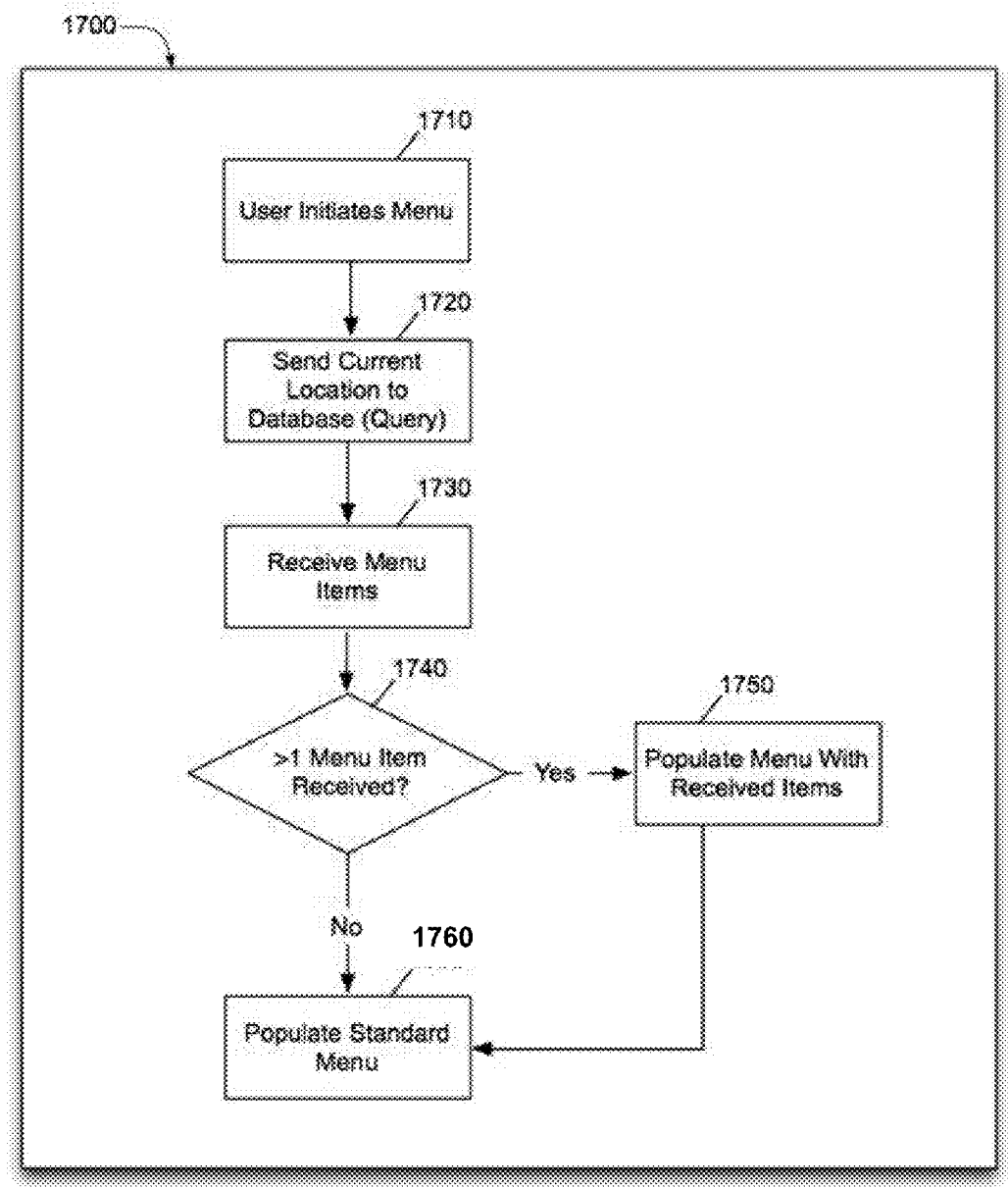
FIG. 8 illustrates a flowchart of a querying procedure for menu items initiated by a user according to example embodiments.

FIG. 8 illustrates a flowchart of a querying procedure for menu items initiated by a user according to example embodiments. Referring to FIG. 8, the flowchart 1700 provides an example of querying for menu items initiated by the user. When a user initiates the context menu 1700, the user performs the necessary action to initiate the display of the context menu 1710. This causes the application to query the database (either internal to the application, or remotely), sending the user's current location in the editing document 1720. The database is queried using the current location and the corresponding menu items are returned 1730. These items are the items that were previously stored in the database when the user selected a menu item in the context menu. If any menu items are returned 1740, then the application populates the context menu with those returned items 1750. If there are no returned items, then the standard items are populated in the context menu 1760. In another example, 1710 can be initiated by the system computer not the user without deviating from the scope of the current application. Since the selected menu items are stored by the application, as well as the location of where the user is currently working within the editing document, the context menu (over time) becomes populated with the menu items that are most useful to the user. For example, if in a particular area of the document, for example when editing a paragraph, the user normally chooses bold, color and indent, these particular menu items will be displayed first when displaying future instantiations of the context menu. As another example, if the user normally uses format, borders and alignment when editing a table, then those menu items will be displayed first upon subsequent instantiations of the context menu.

The context menu is populated with what historically has been selected by the user, as well as what other users selected most of the time. The menu is also populated with what most users use with the same type of document (MICROSOFT WORD, EXCEL, POWERPOINT, and any GOOGLE DOC application, spreadsheet, presentation, calendar applications, or any other online or offline document application), and also within a particular point within a particular document depending on where the user currently operating. For example, the context menu is populated with what the user and/or what other users have historically selected when the user first opens the document and/or at a particular point in the document identified by recent activity from a most recent save function or via cursor position logged at the moment before menu initiation. Also, after a particular action is performed and identified, such as creating a table, drawing, or after a heading, or after text is made bold or a particular action is performed.

In another embodiment, the context menu is populated based on the title of document. For example, for a business titled document, more business types of options are provided. Those options can be tables, charts, spreadsheets, etc. If the title refers to a document reflecting a party or a 'get together', then options will reflect more options relating to embedding clipart, music and/or photos, for invitation creation, etc.

In another example embodiment, the context menu is depicted as a circular menu spiraling downward and/or inward with a larger viewable or selectable space at the entrance to the spiral and less space or real estate further into the spiral, such as the physical layout of a whirlpool or sea shell. This implementation permits minimal use of real estate, but retains the large possible layout of menu items associated with the currently running application on the user's device. The 'options' items of the context menu are displayed as the user traverses the circular menu. The user can select the desired menu item once it appears into view on the circular or spiral-shaped menu. The gesture can be a star shape, a box shape, a triangle shape or another shape where the menu items can be represented along the shape without deviating from the scope of the current application. To view the circular context menu, a gesture is assigned to the application that, when received, will trigger the application to display the menu items in a circular, downward/inward spiral fashion.

Figure 9:
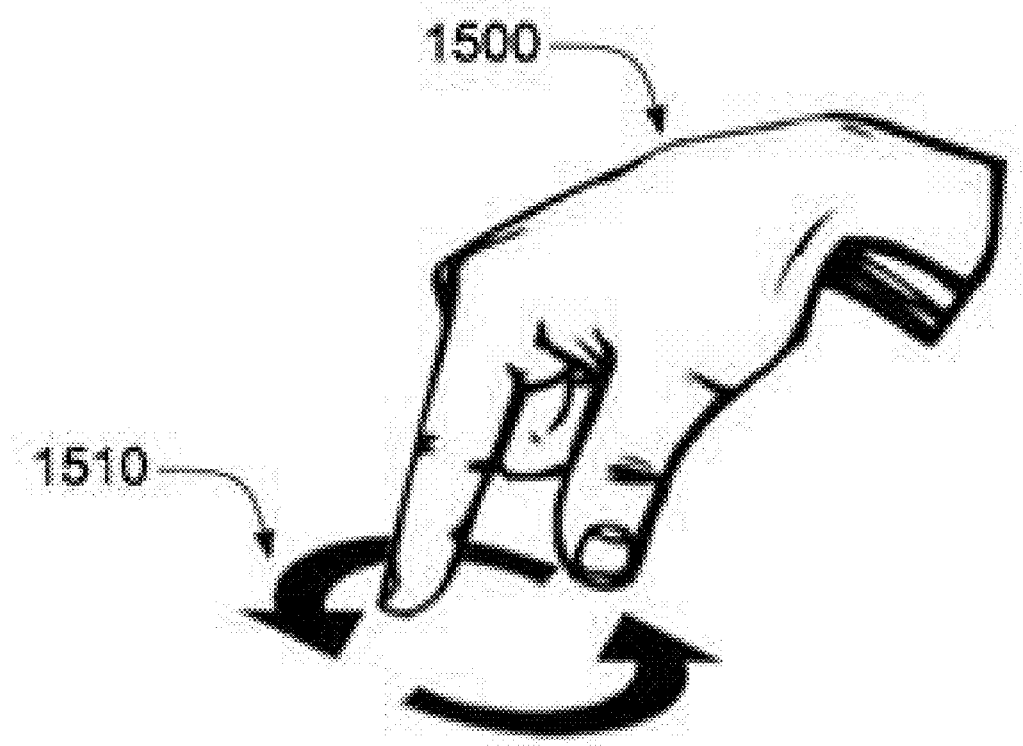
FIG. 9 illustrates a gesture to initiate a circular menu according to example embodiments according to example embodiments.
Figure 12:
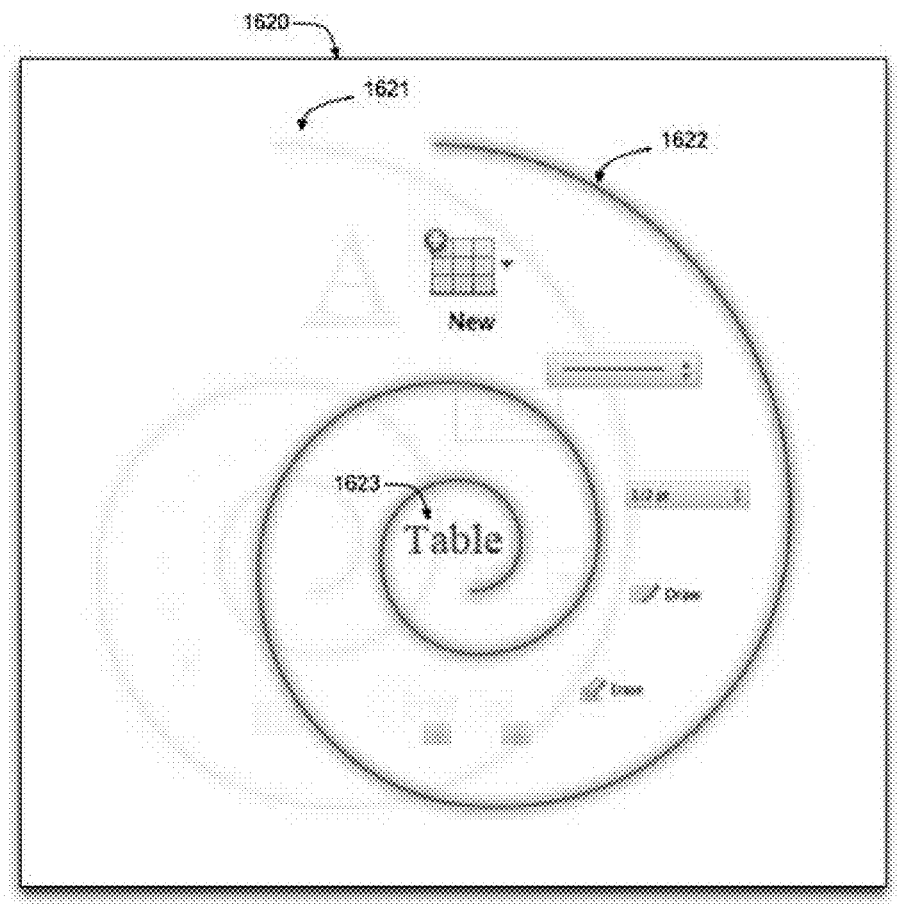
FIG. 12 illustrates a user interface depiction of a menu item with a stacked alteration and a title included in the center according to example embodiments.

FIG. 9 illustrates a gesture to initiate a circular menu according to example embodiments according to example embodiments. Referring to FIG. 9, the user hand gestures to initiate the circular menu as depicted in FIG. 12 above, the user's pointing device 1500 is illustrated. This pointing device can be the user's finger, fingers, thumb, and/or hand (as depicted in FIG. 9), or can be any of the other mentioned pointing devices. The gesture utilized is one or more movement(s) along the touchscreen, that when moved in a circular fashion, for example 1510 initiates the functionality to display the circular context menu. In another embodiment, the gesture can be a movement other than a circular motion. The gesture is made by the user's pointing device on the mobile device 12, 14. The gesture is different from other gestures and is appropriately separate from other gestures on the device to allow for the initiation of the circular context menu functionality. The circular motion can be from right to left (from the top) to allow the circular motion of the menu items to move upward on the spiral, or from left to right (from the top) where the menu items move inward on the spiral. In another embodiment, the opposite direction and movement can be defined without deviating from the scope of the application.

The input gesture(s) can be either directly on the user device's touchscreen on the device or may be made just above the user's device where the hardware on the user's device is able to respond to gestures made above the touchscreen. When the user inputs the gesture utilized to display the context menu, the application on the user's device 12/14 sends a message to the system computer 18 and/or the database 20, if necessary. This message, and the corresponding response, can contain the menu items displayed in the context menu. Current mobile devices on the market publish software development kits (SDK) that provide for the executing application to register and respond to events where the pointing device is approximately 10 mm above the touchscreen. For example, one published SDK mentions a listener entitled 'SPenHoverListener'. The 'SPenHoverListener' permits the developer to handle events where the pointing device such as the SPen is placed above the touchscreen of the mobile device. The listener is used to handle events thrown by an SPen hovering over the touchscreen of the mobile device, such as 'onHover'—called when the hover event occurs as the SPen reaches a certain distance from the screen without touching the surface, 'onHoverButtonDown'—called when the hover event occurs as the SPen reaches a certain distance from the screen without touching the surface with the button depressed on the side of the SPen, 'onHoverbuttonUp'—called when the hover event occurs as the SPen reaches a certain distance from the screen without touching the surface with the button released on the side of the SPen.

As an example, the pseudocode below depicts the context hovering selection operation as utilized in an application,

```
Context mContext = this;
    SCanvasView           mSCanvas          =
(SCanvasView)findViewById(R.id.canvas_view);
    mSCanvas.setSPenHoverListener(new SPenHoverListener( )
    {
        @Override
        public boolean onHover(View view, MotionEvent
event) {
        }
        @Override
        public void onHoverButtonDown(View view, MotionEvent
event) {
        }
        @Override
        public void onHoverButtonUp(View view,
MotionEvent event) {
            // Show S Pen-Settings pop-up
                // window when the side button on the S
Pen is pressed.
            mSCanvas.toggleShowSettingView(
                SCanvasConstants.SCANVAS_SETTINGVIEW_PEN
        );
        }
    } ) .
```

In another example embodiment, once the circular context menu is displayed, other gestures permit for the traversing of the menu items on the context menu. For example, the user can move the pointing device from left to right to move the menu items down the circular context menu. The user can also move the pointing device from right to left to move the menu items up the circular context menu.

Figure 10:
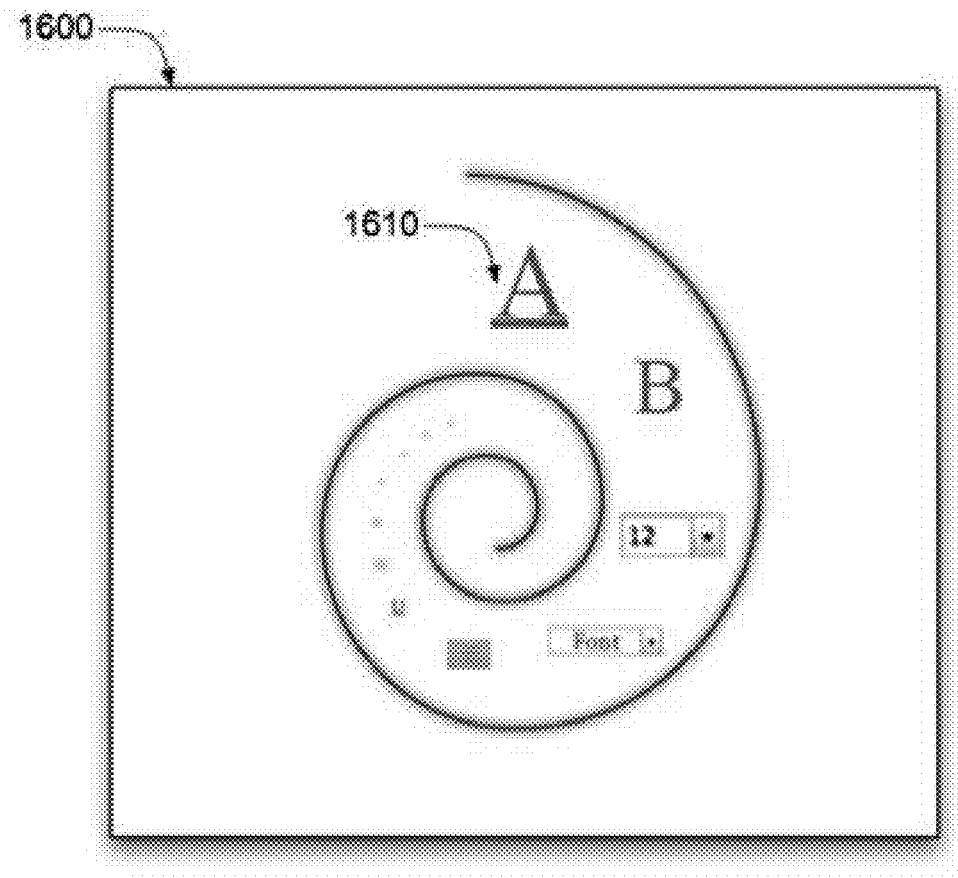
FIG. 10 illustrates a user interface depiction of a circular menu according to example embodiments.

FIG. 10 illustrates a user interface depiction of a circular menu according to example embodiments. Referring to FIG.

10, an example of the circular context menu 1600 includes the menu items 1610 being encased in the circular menu that spirals downward/inward. As the spiral context menu visually goes downward, the menu items are scaled smaller to provide the appearance of moving down or into the spiral menu. As the menu items are placed on the context menu at the top of the context menu, they are scaled larger and finally "drop off" the menu at the top of the circular menu. The circular gesture is repeated by the user's pointing device that permits the traversing of the circular context menu. The gesture can be in either direction allowing the user to move the menu items upward or downward depending on the direction of the circular gesture. As the user traverses upwards on the circular context menu, the menu items 1610 are removed from the circular context menu when they reach the top position of the circular context menu. The menu items that have been removed from the circular context menu are placed back on the circular context menu as the user traverses downward, in the same order as they were removed from the menu.

In another embodiment, when the user stops the gesture of moving the menu items on the context menu, the context menu is placed in a "frozen" state, permitting the user to make a selection of a menu item. In this example embodiment, the current top-viewed menu item on the context menu is automatically selected and/or implemented when the user's pointing device is removed from the device touch screen to "unfreeze" the context menu. In an additional embodiment of the present application, the context menu appears away from where the user is providing the gesture movements. By recording the location of the user's pointing device(s) on the touchscreen, the application can display the context menu in an area that is away from the location of the gestures. This functionality permits the user to make the gestures in an area that he/she is viewing, understanding that the context menu will not appear in that same area.

The mobile applications interact with the touchscreen through 'events'. For instance, events are associated with a variety of different actions. In mobile programming applications described with reference to example embodiments, touchscreen events are "captured" through a procedure that is used to look for a specific event initiated by the device. For example, the following example is used to capture a touch event on the mobile device's touchscreen: 'onTouchEvent(MotionEvent event)'. In this procedure, the executing application is notified that the screen has been touched. This operation is linked with an activity being performed, such as the program that is currently executing on the device. Within the executing application, the action associated with touchscreen may be retrieved to determine whether there is a touch, a movement, etc., and the event can be analyzed to ascertain specific elements of the detected event. The 'getAction' procedure of the event permits us to determine specific elements, for example: Int action=event.getAction( ). Once the action of the event is identified, the specific movement and nature of the action can be determined. The captured action can be 'ACTION_MOVE ->' to indicate moving the pointing device on the screen, 'ACTION_DOWN ->' to indicate the screen being pushed with a pointing device, 'ACTION_UP ->' to indicate we have removed the pointing device from the screen. Using this approach, conditional statements can be used that allow additional functionality. The following pseudocode is an example of capturing the user's pointing device being placed on the touchscreen of the mobile device, and displaying a window on the display:

```
IF (action=MotionEvent.ACTION_DOWN){
//Show the pop up
}.
```

In this example, the event's action is compared to a literal element "MotionEvent.ACTION_DOWN", and if the conditional statement is resolved to be "TRUE", then the statement inside the conditional statement is executed, otherwise the statement is skipped and the execution is continued after the statement. There are other elements of the event that can be determined at runtime. For example, the exact coordinates of where the touchscreen was touched can be determined by diving into the following attributes of the event: event.getX( ) and event.getY( ).

Other event attributes can be determined by calling the following functions, and sending the captured event as a parameter: onKeyUp(int keyCode, KeyEvent event, onKeyDown(int keyCode, KeyEvent event). The "onKeyDown" function is called when a key is pressed, and "onKeyUp" function is called when a key is released. The "int" parameter of the procedure provides the code of the particular key that was either pressed or released. By utilizing the two methods "event.getX( )" and "event.getY( )", the application is able to determine exactly where the user's pointing device has touched the display, and the context menu can either be displayed in the same area of the display, or (more likely) be displayed in a portion of the screen away from where the pointing device touched the device. The selected menu item on the circular context menu is selected by the user touching the viewable menu item, and/or automatically selected by the user pressing a key on the device's keyboard (for example—the return key) where the menu item that is at the topmost of the circular context menu is selected.

When the desired menu is viewed on the circular context menu, the user can touch the menu item and its functionality will be executed by the application. This may be based on one or more functionalities, such as selecting the functionality associated with the menu item, and/or dropping down the menu item displaying more options for the user, such as selecting a font-size. In another embodiment, particular menu items are items, when selected, initiate another context menu. This permits for "stacked" context menus. This implementation permits for an increasing number of context menus that are displayed when particular menu items are selected. In this implementation, the menu items that display a stacked context menu can be modified to provide an indication to the user reflecting their different implementations. For example, if a menu item that, when selected, displays a "stacked" menu item, the icon may be modified by adding another element to the icon. For example, a box (either colored or non-colored) is added to the icon.

Figure 11:
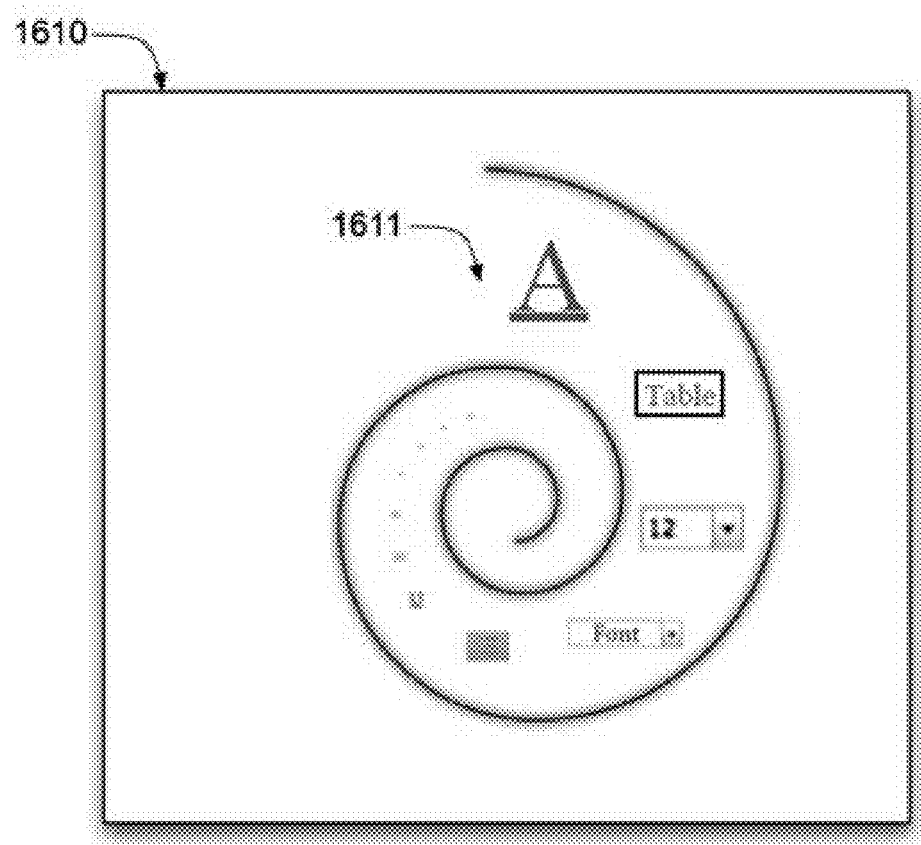
FIG. 11 illustrates a user interface depiction of a menu item with a stacked alteration to an icon according to example embodiments.

FIG. 11 illustrates a user interface depiction of a menu item with a stacked alteration to an icon according to example embodiments. Referring to FIG. 11, the menu item provides a stacked alteration to the icon. The circular context menu 1610 illustrates a modification made to the second menu item 1611 from the previous example of FIG. 11. The second element entitled "Table" has been encased by a rectangle. This result indicates to the user that the menu item contains a sub-menu. When the user selects this menu item, the application responds by displaying another circular context menu. The sub-menu contains menu items that all pertain to the original selected menu item as described in detail in FIG. 12. When a "stacked" menu item is selected, the current context menu is removed from the display and replaced with the new context menu.

FIG. 12 illustrates a user interface depiction of a menu item with a stacked alteration and a title included in the center according to example embodiments. In other embodiments, the previous menu is "ghosted" as depicted in FIG. 12, the new context menu provides, in appearance, a similar result as the original context menu. There is an element added to the context menu that permits the user to easily understand that the context menu is a "stacked" context menu. In the middle of the "stacked" context menu, a text element is added that displays a title of the particular group of items which related to the "stacked" context menu. FIG. 12 illustrates a submenu 1620 with the submenu options 1622 overlaid over the original context menu 1621. All of the elements in the submenu 1622 pertain to the originally selected menu item in the previous context menu 1621 "Table". A title 1623 is added to the center of the submenu 1622, which aids the user in understanding that the current context menu is a submenu relating to a specific topic. In this case, all of the menu items in the submenu 1622 pertain to table functions.

In operation, when the user selects a menu item pertaining to a submenu, the application on the user's device 12/14 transmits a message to the computer system 18 and/or the database 20 if necessary. This message, and the corresponding response, can contain the menu items displayed in the context menu. As the user traverses down the "stacked" context menus, the text added to the middle of the context menu reflects where the user is in the "stacked" context menus. This includes abbreviations of each of the context menus added before the current menu separated by a character (for example "/"). Other text additions can be added to the title of the current context menu can easily be designed without deviating from the scope of the current application.

In other embodiments, particular GUI implementations are added to the title of the current context menu to permit the user to understand where the current context menu is in the "stacked" context menu hierarchy. For example, the current title of the context menu can be placed in the middle of the context menu, with the previous context menu displayed in a smaller font above the current title. This is followed by other previous context menus in the hierarchy (if applicable) displayed above the other titles in a smaller font. In this example, the user is able to continue to traverse down the "stacked" context menus as far as the designer of the application implemented. To traverse up the "stacked" context menus, the implementation allows for an action of the user's pointing device that pertains to this action.

In one example, a particular gesture is assigned to the application that communicates with the application that the user wishes to traverse up the "stacked" context menus. When the user makes a "pinching" gesture (for example), this gesture communicates with the application of this action. When the "pinching" gesture is received, the current "stacked" menu is removed from the display and the previous context menu is added to the display.

Other actions of the user's pointing device can be assigned to the application to communicate that the user wishes to traverse up the "stacked" context menus without deviating from the scope of the current application. For example, a particular key, or key sequence, another particular gesture, and/or a voice input that when converted to text could be assigned to this action. In another embodiment, the newly "stacked" context menu can be displayed on the display over (or nearby) the current context menu wherein the previous context menu is altered to give a "faded" look. This is implemented by changing the color of the previous context menu to a lighter color. As the user inputs the command to remove the current, "stacked" context menu, the currently displayed context menu is removed from the display and the previous context menu is then brought to the forefront by altering the color to the original color. This functionality can be continued through any number of "stacked" context menus thus allowing for a full range of menu items that are categorically organized. By allowing for "stacked" context menus, a large number of grouped menu items are available to the user on a small, mobile device executing an application where a large number of menu items are normally associated with the application.

Figure 13:
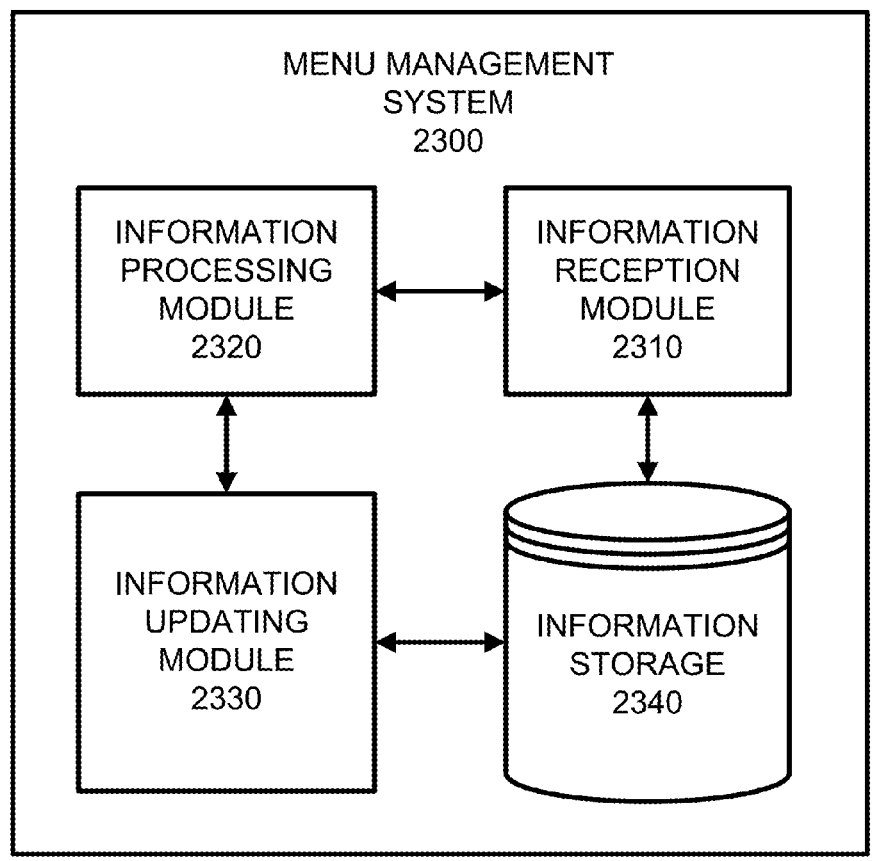
FIG. 13 illustrates a system configuration configured to perform one or more of the example embodiments of the present application.

FIG. 13 illustrates a system configuration configured to perform one or more of the example embodiments of the present application. In one example, the menu management system 2300 may be a computer or server computer or may instead by a series of devices in communication over a network. One example operation may include initiating an application on a user computing device, such as a smartphone or laptop device. The system 2300 may then receive via the information receiving module 2310 the user initiated selection to initiate a menu associated with the application, which includes a plurality of selection options which are presented to a user display interface of the user computing device. The menu can be displayed via the information processing module 2320 in a position of the user display interface with reference to the coordinates of a recent operation performed on the user display interface, such as a location of a user interface selection, manipulation or an automated action performed at a particular location on the display. The information updating module 2330 may pair the coordinates of the previous action with the new location to be used for subsequent display features. All new data and changes are logged in the database 2340.

In another example, a position may be selected based on a recently accessed position of the user display associated with a user input command received at the recently accessed position. Also, the identifying of the coordinates of the recently accessed position may be performed in order to link the coordinates of the recently accessed position to at least a portion of the menu. A predetermined distance may be applied to the coordinates, and the menu may then be displayed at a position located the predetermined distance away from the recently accessed position. This provides a way to add a buffer distance of coordinates to the original position for larger menu options or for more appropriate spacing and location purposes. The system may also receive a plurality of menu option selections from the menu over a period of time (e.g., 1 minute, 2 minutes, 30 minutes, etc.) and transmit the menu options selections to a database for record keeping purposes associated with the user account and device. At some later time, the menu options may be retrieved from memory and ranked to identify a number of occurrences of the menu option selections so a subsequent menu displayed on the application can be populated with a predetermined number of a highest ranked menu options to increase user satisfaction and efficiency on an otherwise limited real estate display space. Another operation may include identifying a trigger action performed by a user input selection, identifying a plurality of menu options corresponding to the trigger action, and populating the menu with the plurality of menu options responsive to receiving the trigger action. Example actions may include a selected topic of interest, details corresponding to that topic, synonyms or related functions, etc.

Another example embodiment may include a method for initiating an application on a user computing device where the system reception module 2310 receives a selection to initiate a circular menu associated with the application including a plurality of selection options on a user display interface of the user computing device. The circular menu may be a spiral shaped menu as noted above in the examples of this application. The system 2300 may identify a user action associated with the application, and populate the circular menu with menu options linked to the user action identified the topic of the action may cause sub-topics and actions to appear accordingly as part of the spiral menu. The circular menu is a spiral-shaped menu that includes a plurality of selection options spiraling inward towards the center of the spiral shaped menu. The system 2300 may then display the plurality of selection options in a descending size format, so further into the spiral shaped menu each of the selection options are displayed becomes progressively smaller on the user display interface. Those items which are larger may be higher ranked and more frequented items and those items closer to the center and smaller may be lesser ranked and lesser utilized by the user. The method may also include receiving a circular gesture input on the spiral shaped menu, removing at least one menu option at the top of the spiral shaped menu responsive to detecting the circular gesture input and also replacing the removed at least one menu option at the top of the spiral shaped menu with a new menu option further down the spiral shaped menu, this displacement and movement function offers recycling of user menu options to different portions of the menu. Also, the removed at least one menu option can be placed at the end of the spiral shaped menu options as the new menu option appears to take its place at the top of the menu. The method may also include receiving a menu option selection of a menu option displayed in the spiral shaped menu, inserting the menu option selection as a title of the center of the spiral shaped menu, removing all the other menu options, and populating the spiral shaped menu with a plurality of new menu options comprising sub-menu options related to the menu option selection. Additionally, the circular menu can be populated with the menu options linked to the user action identified which includes accessing a database and retrieving a plurality of menu items linked to the identified user action. The menu may receive user input over at least a portion of a display area covered by the circular menu, and the menu can be converted to an activate state from an inactivate state responsive to the received user input, and the activate state permits modifications to user options on the circular menu while in that particular state.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 14 illustrates an example network element 2400, which may represent any of the above-described network components, etc.

Figure 14:
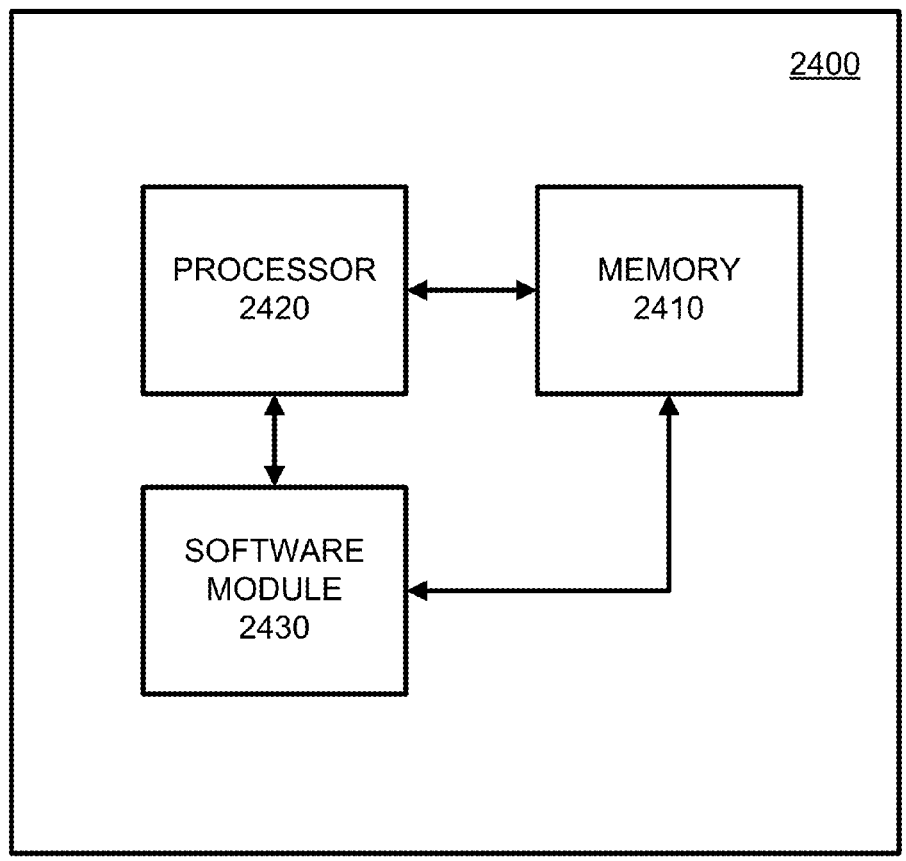
FIG. 14 illustrates an example network entity device configured to store instructions, software, and corresponding hardware for executing the same, according to example embodiments of the present application.

As illustrated in FIG. 14, a memory 2410 and a processor 2420 may be discrete components of the network entity 1400 that are used to execute an application or set of operations. The application may be coded in software in a computer language understood by the processor 2420, and stored in a computer readable medium, such as, the memory 2410. The computer readable medium may be a non-transitory computer readable medium that includes tangible hardware components in addition to software stored in memory. Furthermore, a software module 2430 may be another discrete entity that is part of the network entity 2400, and which contains software instructions that may be executed by the processor 2420. In addition to the above noted components of the network entity 2400, the network entity 2400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 13 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
executing an application on a user computing device;
detecting a dynamic position of a user operation with respect to the application on a user interface of the user computing device;
receiving an input requesting a menu associated with the application, the requested menu comprising a plurality of selection options and being configured for display on the user interface of the user computing device;
determining a display location for the requested menu on the user interface, wherein when the request for the menu is received the display location is undetermined, and in response to receiving the request for the menu, the display location is dynamically determined by determining a buffer distance between the dynamic position of the user operation on the user interface and a nearest outer display boundary of the requested menu so as not to obstruct a view of the user operation on the user interface; and
displaying the requested menu at the dynamically determined display location such that the nearest outer display boundary of the displayed menu is spaced apart from the user operation by the buffer distance.

2. The method of claim 1, wherein the dynamic position comprises a recently accessed position of the user interface and is associated with a user input command received at the recently accessed position.

3. The method of claim 2, further comprising:
identifying the coordinates of the dynamic position; and
linking the coordinates to at least a portion of the displayed menu.

4. The method of claim 3, further comprising:
applying a predetermined distance to the coordinates; and
displaying the requested menu at a position located the predetermined distance away from the coordinates of the dynamic position.

5. The method of claim 1, further comprising:
receiving a plurality of menu option selections from the displayed menu over a period of time;
transmitting the menu option selections to a database; and
storing the menu option selections.

6. The method of claim 5, further comprising:
retrieving the menu option selections from memory;
ranking the menu option selections to identify a number of occurrences of each of the menu option selections; and
populating a subsequent menu displayed on the application with a predetermined number of a highest ranked menu option selections.

7. The method of claim 1, further comprising:
identifying a trigger action performed by a user input selection;
identifying a plurality of menu options corresponding to the trigger action; and
populating the requested menu with the plurality of menu options responsive to receiving the trigger action.

8. An apparatus comprising:
a processor configured to execute an application on a user computing device, and detect a dynamic position of a user operation with respect to the application on a user interface of the user computing device; and
a receiver configured to receive an input requesting a menu associated with the application, the requested menu comprising a plurality of selection options and being configured for display on the user interface of the user computing device;
wherein the processor is further configured to determine a display location for the requested menu on the user interface, wherein when the request for the menu is received the display location is undetermined, and in response to receiving the request for the menu, the display location is dynamically determined by determining a buffer distance between the dynamic position of the user operation on the user interface and a nearest outer display boundary of the requested menu so as not to obstruct a view of the user operation on the user interface, and the processor is further configured to display the selected menu at the dynamically set display location such that the nearest outer display boundary of the displayed menu is spaced apart from the user operation by the buffer distance.

9. The apparatus of claim 8, wherein the dynamic position comprises a recently accessed position of the user interface and is associated with a user input command received at the recently accessed position.

10. The apparatus of claim 9, wherein the processor is further configured to identify the coordinates of the dynamic position, and link the coordinates to at least a portion of the displayed menu.

11. The apparatus of claim 10, wherein the processor is further configured to apply a predetermined distance to the coordinates, and display the requested menu at a position located the predetermined distance away from the coordinates of the dynamic position.

12. The apparatus of claim 8, wherein the receiver is configured to receive a plurality of menu option selections from the displayed menu over a period of time; and
the processor is further configured to transmit the menu option selections to a database, and store the menu option selections.

13. The apparatus of claim 12, wherein the processor is further configured to retrieve the menu option selections from memory, and rank the menu option selections to identify a number of occurrences of each of the menu option selections.

14. The apparatus of claim 8, wherein the processor is further configured to identify a trigger action performed by a user input selection, identify a plurality of menu options corresponding to the trigger action, and populate the requested menu with the plurality of menu options responsive to receiving the trigger action.

15. A non-transitory computer readable storage medium configured to store instructions that when executed cause a processor to perform:
executing an application on a user computing device;
detecting a dynamic position of a user operation with respect to the application on a user interface of the user computing device;
receiving an input requesting a menu associated with the application, the requested menu comprising a plurality of selection options and being configured for display on the user interface of the user computing device;
determining a display location for the requested menu on the user interface, wherein when the request for the menu is received the display location is undetermined, and in response to receiving the request for the menu, the display location is dynamically determined by determining a buffer distance between the dynamic position of the user operation on the user interface and a nearest outer display boundary of the requested menu so as not to obstruct a view of the user operation on the user interface; and
displaying the requested menu at the dynamically determined display location such that the nearest outer display boundary of the displayed menu is spaced apart from the user operation by the buffer distance.

16. The non-transitory computer readable storage medium of claim 15, wherein the dynamic position comprises a recently accessed position of the user interface and is associated with a user input command received at the recently accessed position.

17. The non-transitory computer readable storage medium of claim 15, wherein the processor is further configured to perform:
identifying the coordinates of the dynamic position; and
linking the coordinates to at least a portion of the displayed menu.

18. The non-transitory computer readable storage medium of claim 17, wherein the processor is further configured to perform:
applying a predetermined distance to the coordinates; and
displaying the requested menu at a position located the predetermined distance away from the dynamic position.

19. The non-transitory computer readable storage medium of claim 15, wherein the processor is further configured to perform:
receiving a plurality of menu option selections from the displayed menu over a period of time;
transmitting the menu option selections to a database; and
storing the menu option selections.

20. The non-transitory computer readable storage medium of claim 19, wherein the processor is further configured to perform
retrieving the menu option selections from memory;
ranking the menu option selections to identify a number of occurrences of the menu option selections;
identifying a trigger action performed by a user input selection;
identifying a plurality of menu options corresponding to the trigger action; and
populating the requested menu with the plurality of menu options responsive to receiving the trigger action.

21. The method of claim 1, wherein the displaying comprises displaying the requested menu with shading around an outside edge of the menu such that the displayed menu appears to hover over the application.

22. The method of claim 21, further comprising receiving a command via the user interface to move the hovering menu across the user interface, and in response, moving the hovering menu in a direction corresponding to the command and also partially in a different direction to avoid a conflict with a user interaction with the application on the user interface while the hovering menu is moving in the corresponding direction across the screen.

\* \* \* \* \*